US012719225B2

(12) United States Patent
Yudate

(10) Patent No.: US 12,719,225 B2
(45) Date of Patent: Aug. 25, 2026

(54) TERMINAL-EQUIPPED ELECTRIC WIRE

(71) Applicant: YAZAKI CORPORATION, Tokyo (JP)

(72) Inventor: Takahiro Yudate, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 344 days.

(21) Appl. No.: 18/645,453

(22) Filed: Apr. 25, 2024

(65) Prior Publication Data

US 2024/0275077 A1 Aug. 15, 2024

Related U.S. Application Data

(63) Continuation of application No. PCT/JP2023/000476, filed on Jan. 11, 2023.

(30) Foreign Application Priority Data

Feb. 16, 2022 (JP) ................................ 2022-021923

(51) Int. Cl.
*H01R 43/02* (2006.01)
*H01R 4/02* (2006.01)
*H01R 43/048* (2006.01)

(52) U.S. Cl.
CPC ......... *H01R 43/0207* (2013.01); *H01R 4/023* (2013.01); *H01R 43/048* (2013.01)

(58) Field of Classification Search
CPC ............................ H01R 43/0207; H01R 4/023
USPC .......................................................... 439/874
See application file for complete search history.

(56) References Cited

U.S. PATENT DOCUMENTS

| | | | | |
|---|---|---|---|---|
| 10,601,147 | B2 * | 3/2020 | Tamagawa | H01R 4/023 |
| 2006/0169742 | A1 | 8/2006 | Fujimoto et al. | |
| 2014/0311798 | A1 | 10/2014 | Numata et al. | |
| 2019/0260140 | A1 | 8/2019 | Nabeta et al. | |
| 2022/0241890 | A1 * | 8/2022 | Yamanaka | B23K 20/10 |

FOREIGN PATENT DOCUMENTS

| | | | | |
|---|---|---|---|---|
| CN | 111937242 | A * | 11/2020 | B23K 20/10 |
| JP | 2006-172927 | A | 6/2006 | |
| JP | 2014-107104 | A | 6/2014 | |
| JP | 2014-211952 | A | 11/2014 | |
| JP | 2019-40778 | A | 3/2019 | |
| JP | 2019-145263 | A | 8/2019 | |
| JP | 2021034287 | A * | 3/2021 | |
| WO | WO-2015141440 | A1 * | 9/2015 | H01R 43/0207 |

* cited by examiner

*Primary Examiner* — Marcus E Harcum
(74) *Attorney, Agent, or Firm* — KENEALY VAIDYA LLP

(57) ABSTRACT

To include: an electric wire including a core wire that includes an element wire bundle and a sheath that covers the core wire over a circumferential direction and including a core wire exposed portion in which a part of the core wire is exposed over the circumferential direction; and a terminal fitting that includes a core wire connection portion including a flat face on which the core wire exposed portion is placed, and in which a bonding portion of the core wire exposed portion is ultrasonically bonded to the flat face of a bonded portion of the core wire connection portion.

4 Claims, 4 Drawing Sheets

TERMINAL-EQUIPPED ELECTRIC WIRE

CROSS-REFERENCE TO RELATED APPLICATION(S)

This application is a continuation application of International Application PCT/JP2023/000476, filed on Jan. 11, 2023 which claims the benefit of priority from Japanese Patent Application No. 2022-021923 filed on Feb. 16, 2022 and designating the U.S., the entire contents of which are incorporated herein by reference.

BACKGROUND OF THE INVENTION

1. Field of the Invention

The present invention relates to a terminal-equipped electric wire.

2. Description of the Related Art

Concerning a method of manufacturing a terminal-equipped electric wire, a conventionally known technique for physically and electrically connecting an electric wire and a terminal fitting is ultrasonic bonding in which ultrasonic vibration is applied to a core wire exposed portion of the electric wire and a core wire connection portion of the terminal fitting while pressure is applied thereto. In this ultrasonic bonding, while the core wire exposed portion and the core wire connection portion are sandwiched and pressurized between two dies, ultrasonic vibration whose vibration direction is along the axial direction of the core wire exposed portion is applied from one die (vibrating die) to the core wire exposed portion. Such pressurization and the ultrasonic vibration cause element wires of the core wire exposed portion to be ultrasonically bonded to each other, and cause an element wire of the core wire exposed portion and the core wire connection portion to be ultrasonically bonded to each other. In this way, the electric wire and the terminal fitting are formed as a terminal-equipped electric wire. This type of terminal-equipped electric wire is disclosed in, for example, Japanese Patent Application Laid-open No. 2006-172927, Japanese Patent Application Laid-open No. 2014-107104, Japanese Patent Application Laid-open No. 2014-211952, Japanese Patent Application Laid-open No. 2019-040778 and Japanese Patent Application Laid-open No. 2019-145263.

The core wire exposed portion of the electric wire is squashed in a direction toward the core wire connection portion side by the vibrating die together with the pressurization. Accordingly, the height of the core wire exposed portion from the core wire connection portion gradually decreases from the end face of the sheath to the portion squashed by the vibrating die. For this reason, in the core wire exposed portion, when the vibrating die reciprocating in the vibrating direction collides with the height-varying slope, an element wire at the slope may cause element wire breakage.

SUMMARY OF THE INVENTION

In view of the above, an object of the present invention is to provide a terminal-equipped electric wire in which occurrence of element wire breakage is prevented.

A terminal-equipped electric wire according to one aspect of the present invention includes an electric wire including a core wire that includes an element wire bundle and a sheath that covers the core wire over a circumferential direction, the electric wire including a core wire exposed portion in which a part of the core wire is exposed over the circumferential direction; and a terminal fitting including a core wire connection portion that includes a flat face on which the core wire exposed portion is placed, a bonding portion of the core wire exposed portion being ultrasonically bonded to the flat face of a bonded portion of the core wire connection portion, wherein the core wire exposed portion includes a compressed recess between the bonding portion and an end face of the sheath, the compressed recess being compressed toward the flat face of the core wire connection portion and being recessed to a position lower than a height of the bonding portion from the flat face of the core wire connection portion.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, an embodiment of a terminal-equipped electric wire according to the present invention will be described in detail with reference to the drawings. Note that this invention is not limited to the embodiment.

EMBODIMENT

Hereinafter, one embodiment of a terminal-equipped electric wire according to the present invention will be described with reference to FIGS. 1 to 4.

Figure 1:
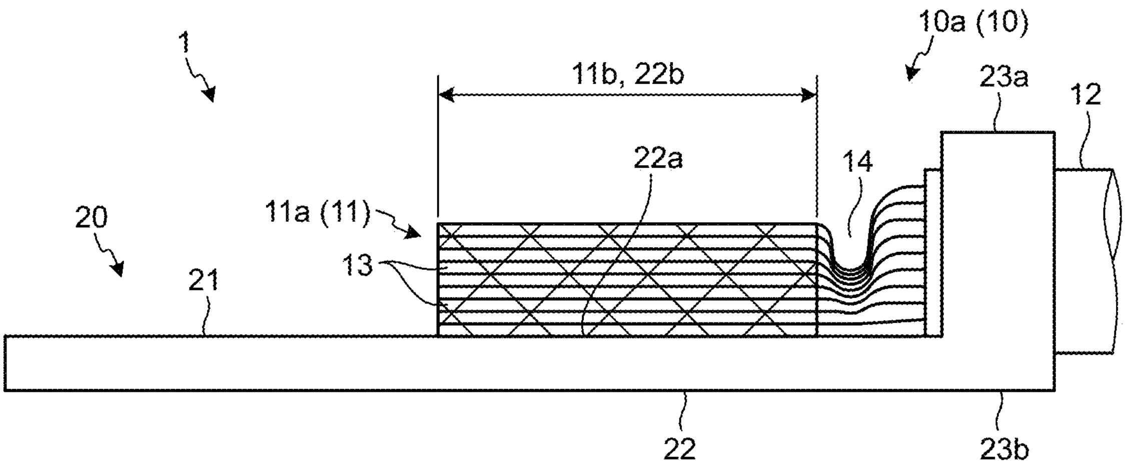
FIG. 1 is an explanatory view illustrating a terminal-equipped electric wire according to an embodiment.

Reference sign 1 in FIG. 1 indicates a terminal-equipped electric wire in the present embodiment.

The terminal-equipped electric wire 1 includes an electric wire 10 and a terminal fitting 20 that are physically and electrically connected to each other (FIG. 1).

Figure 2:
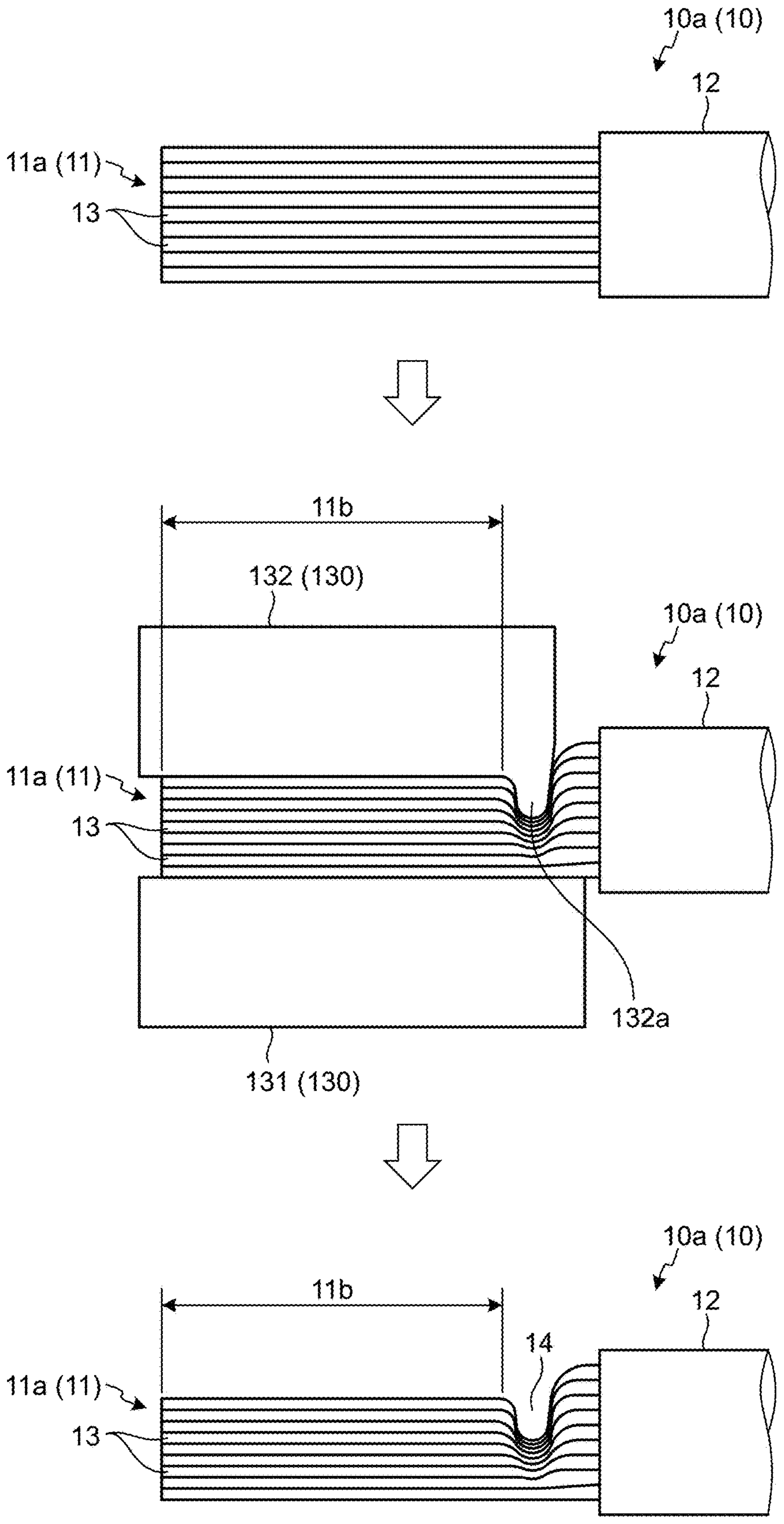
FIG. 2 is an explanatory view for describing a core wire processing step.
Figure 3:
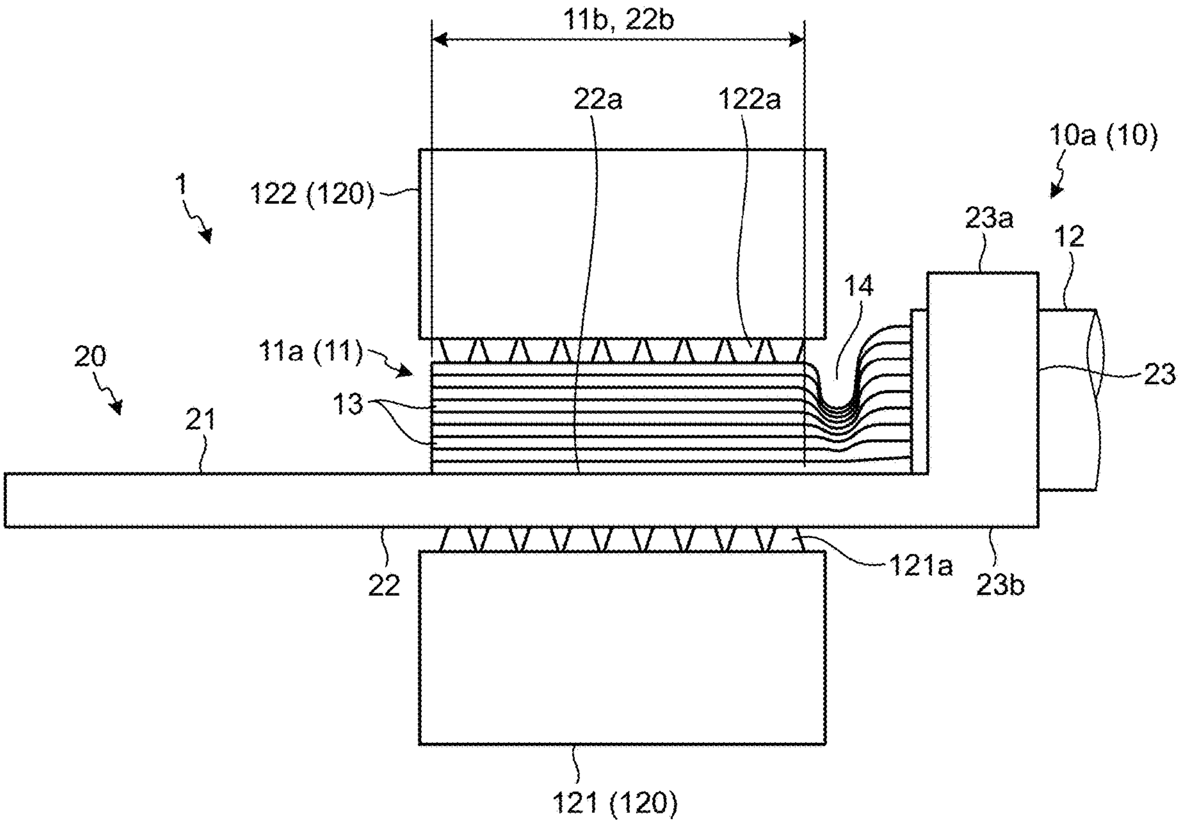
FIG. 3 is an explanatory view for describing a bonding step.

The electric wire 10 includes a core wire 11 and a sheath 12. The core wire 11 is covered with the tubular sheath 12 from the outer peripheral face side over the circumferential direction (FIGS. 1 to 3). The core wire 11 is configured as an element wire bundle in which a plurality of element wires 13 each made of a conductive metal wire material are bundled. The sheath 12 is formed of an insulating synthetic resin material that covers the core wire 11 from the outer peripheral face side.

The electric wire 10 includes a core wire exposed portion **11*a* in which a part of the core wire 11 is exposed over the circumferential direction (FIGS. 1 to 3). For example, in the electric wire 10, the sheath 12 of the electric wire 10 is subjected to processing such as stripping the end of the sheath 12 in the circumferential direction at a terminal (hereinafter, referred to as an "electric wire terminal") 10*a*** of the electric wire 10. With this processing, the core wire exposed portion 11*a* exposed over the entire circumference is provided at the electric wire terminal 10*a*. The core wire exposed portion 11*a* of the electric wire terminal 10*a* protrudes from the annular end face of the sheath 12, and a place away from the end face of the sheath 12 toward the free end side is ultrasonically bonded to the terminal fitting 20. For example, in the electric wire 10, the sheath 12 is stripped in the circumferential direction in the middle of the axis of the electric wire 10. With such processing, the core wire exposed portion 11*a* exposed over the entire circumference is provided between the two annular end faces of the sheath 12 in the middle of the axis of the electric wire 10. The core wire exposed portion 11*a* in the middle of the electric wire 10 is ultrasonically bonded to the terminal fitting 20, at a place between the two end faces of the sheath 12 and away from each end face.

In the terminal-equipped electric wire 1, the terminal fitting 20 is attached to the core wire exposed portion 11*a* at the terminal or in the middle of the electric wire 10. The electric wire 10 illustrated here includes the core wire exposed portion 11*a* at the electric wire terminal 10*a*. Accordingly, in this terminal-equipped electric wire 1, the terminal fitting 20 is attached to the core wire exposed portion 11*a* at the electric wire terminal 10*a*.

The terminal fitting 20 is formed of a conductive material such as metal. The terminal fitting 20 is formed into a predetermined shape by, for example, press forming such as bending or cutting a metal plate serving as a base material.

The terminal fitting 20 includes a terminal connection portion 21 which is physically and electrically connected to a counterpart (not illustrated) (FIGS. 1 and 3). The terminal connection portion 21 may be physically and electrically connected to the counterpart in any form. For example, the terminal connection portion 21 may be formed in a flat plate shape having a through hole (not illustrated), and may be screwed and fixed to the terminal connection portion of the counterpart terminal fitting by screwing a female screw member to a male screw member inserted through the through hole of the terminal connection portion 21 and a through hole of the terminal connection portion of the counterpart terminal fitting (not illustrated). In another example, one of the terminal connection portion 21 of the terminal fitting 20 and the terminal connection portion of the counterpart terminal fitting may be formed in a female terminal shape, and the other thereof may be formed in a male terminal shape. With this configuration, the male terminal-shaped terminal connection portion may be inserted into the female terminal-shaped terminal connection portion, and these terminal connection portions may be fitted to each other.

The terminal fitting 20 includes: a flat face 22*a* on which the core wire exposed portion 11*a* of the electric wire 10 is placed; and a core wire connection portion 22 that physically and electrically connects the core wire exposed portion 11*a* to the flat face 22*a* (FIGS. 1 and 3). In the core wire connection portion 22, a bonding portion 11*b* of the core wire exposed portion 11*a* is ultrasonically bonded to the flat face 22*a* of a bonded portion 22*b*. The core wire connection portion 22 illustrated here is formed in a flat plate shape.

The terminal fitting 20 includes a sheath holder 23 that holds the sheath 12 of the electric wire terminal 10*a* (FIGS. 1 and 3). The sheath holder 23 holds the sheath 12 by, for example, swaging and crimping a pair of barrel pieces 23*a* to the sheath 12 of the electric wire terminal 10*a*.

The terminal fitting 20 illustrated here is formed to include: one flat plate-shaped piece including the terminal connection portion 21, the core wire connection portion 22, and a bottom 23*b* of the sheath holder 23; and the pair of barrel pieces 23*a* protruding from the bottom 23*b* of the sheath holder 23. However, the terminal fitting 20 may be formed into any shape such as, for example, an intersecting shape obtained by bending the terminal fitting 20 to have a section on the terminal connection portion 21 side and a section on the side of the core wire connection portion 22 and the sheath holder 23.

The terminal-equipped electric wire 1 described above is created by manufacturing machinery 101 (FIG. 4) described below and a manufacturing method using the same.

Figure 4:
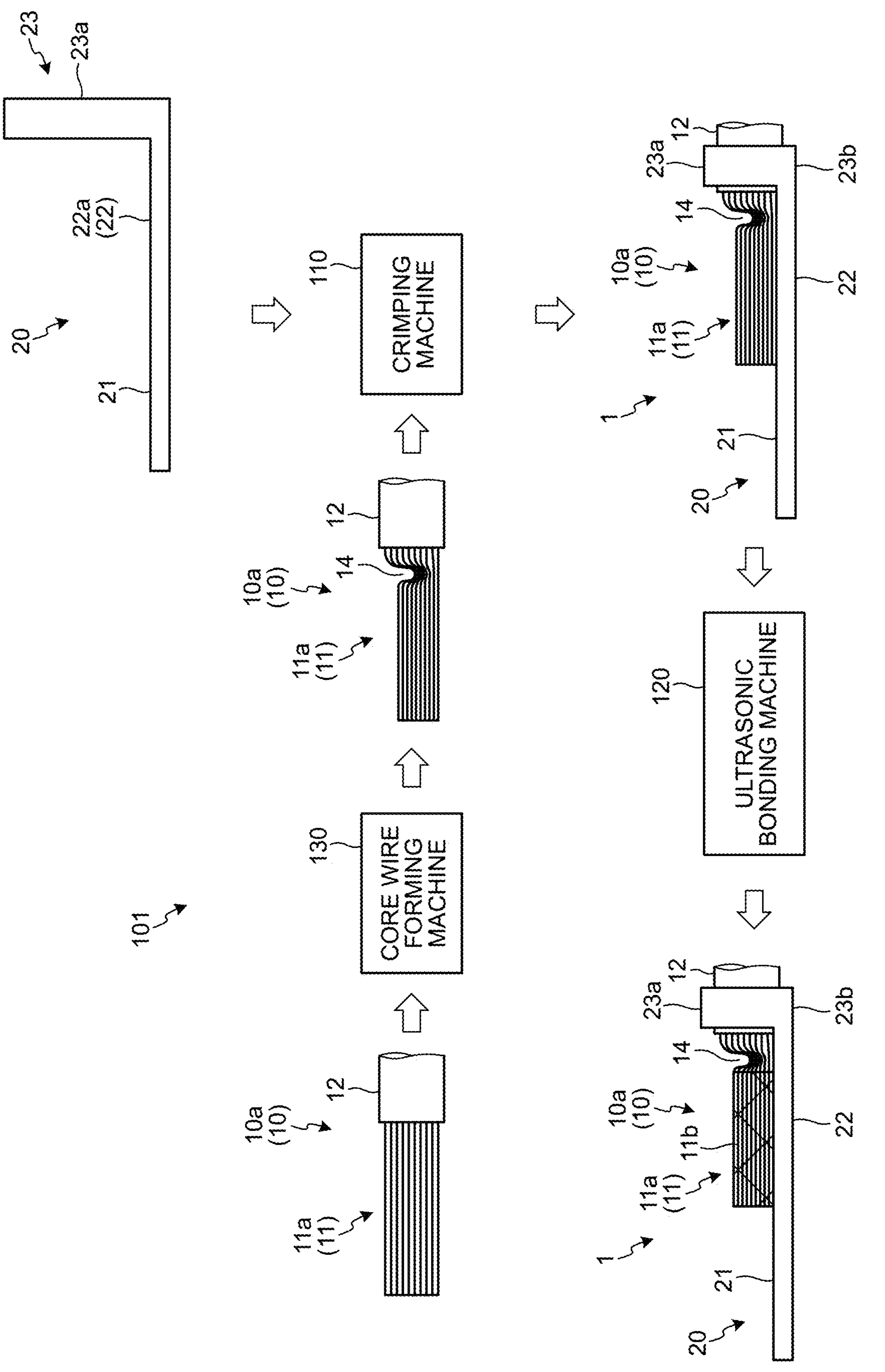
FIG. 4 is an explanatory view illustrating manufacturing machinery according to the embodiment.

The method of manufacturing the terminal-equipped electric wire 1 includes: an electric wire placing step of placing the electric wire terminal 10*a* on the flat face 22*a* of the core wire connection portion 22 and the bottom 23*b* of the sheath holder 23; an electric wire holding step of swaging and crimping the pair of barrel pieces 23*a* of the sheath holder 23 to the sheath 12 of the electric wire terminal 10*a*; and a bonding step of ultrasonically bonding the bonding portion 11*b* of the core wire exposed portion 11*a* and the bonded portion 22*b* at the flat face 22*a* of the core wire connection portion 22. The manufacturing machinery 101 for the terminal-equipped electric wire 1 includes a crimping machine 110 for performing the electric wire placing step and the electric wire holding step, and an ultrasonic bonding machine 120 for performing the bonding step (FIG. 4).

The crimping machine 110 includes a pair of dies (not illustrated) for swaging and crimping the sheath holder 23 to the sheath 12 of the electric wire terminal 10*a* while sandwiching and pressurizing the bottom 23*b* of the sheath holder 23 and the pair of barrel pieces 23*a*.

The terminal fitting 20 is placed on one die. The electric wire terminal 10*a* is placed on the terminal fitting 20 placed on the one die. The other die is a die that can reciprocate to be brought closer to or away from the one die. The other die is attached to a drive unit (not illustrated) that causes the reciprocation. The other die is brought closer to the one die to swage and crimp the sheath holder 23 to the sheath 12 of the electric wire terminal 10*a*.

In the electric wire placing step, the terminal fitting 20 is placed on the one die, and the electric wire terminal 10*a* is placed on the flat face 22*a* of the core wire connection portion 22 and the bottom 23*b* of the sheath holder 23 in the terminal fitting 20. In the electric wire holding step, while the other die is brought closer to the one die, the pair of barrel pieces 23*a* of the sheath holder 23 is wound around the sheath 12 of the electric wire terminal 10*a* and swaged and crimped by the other die at the same time. In the electric wire placing step illustrated here, the bonding portion 11*b* of the core wire exposed portion 11*a* is placed on the flat face 22*a* of the bonded portion 22*b* of the core wire connection portion 22. Then, in the electric wire holding step, the sheath holder 23 is swaged and crimped to the sheath 12 of the electric wire terminal 10*a* in a state where the bonding portion 11*b* of the core wire exposed portion 11*a* is placed on the bonded portion 22*b* of the core wire connection portion 22.

Here, the core wire exposed portion 11*a* is ultrasonically bonded to the terminal fitting 20 holding the electric wire 10 by the sheath holder 23. The ultrasonic bonding machine 120 includes a first die 121 and a second die 122 that apply ultrasonic vibration to the bonding portion 11*b* and the bonded portion 22*b* while sandwiching and pressurizing the bonding portion 11*b* of the core wire exposed portion 11*a* and the bonded portion 22*b* of the core wire connection portion 22 (FIG. 3).

The bonded portion 22*b* of the core wire connection portion 22 is placed on the first die 121. The first die 121 illustrated here includes a contact portion 121*a* including a plurality of protrusions and recesses, and the bonded portion 22*b* is placed on the contact portion 121*a* (FIG. 3). The contact portion 121*a* is, for example, a plurality of protrusions and recesses formed by knurling performed on the first die 121.

The second die 122 is a die that can reciprocate to be brought closer to or away from the first die 121. The second die 122 is attached to a drive unit (not illustrated) that causes the reciprocation. By being brought closer to the first die 121, the second die 122 comes into contact with the bonding portion 11*b* of the core wire exposed portion 11*a* on the bonded portion 22*b* of the core wire connection portion 22, and the bonding portion 11*b* and the bonded portion 22*b* are sandwiched and pressurized between the first die 121 and the second die 122. The second die 122 illustrated here includes a contact portion 122*a* similar to the contact portion 121*a* of the first die 121, and the contact portion 122*a* is brought into contact with the bonding portion 11*b* of the core wire exposed portion 11*a* (FIG. 3).

In the bonding step, the other flat face of the bonded portion 22*b* of the core wire connection portion 22 is placed on the first die 121. In this state, the bonding portion 11*b* of the core wire exposed portion 11*a* is placed on the flat face 22*a* of the bonded portion 22*b* of the core wire connection portion 22. Therefore, in this bonding step, the bonded portion 22*b* and the bonding portion 11*b* are ultrasonically bonded to each other by the ultrasonic vibration applied to the second die 122 while the bonded portion 22*b* and the bonding portion 11*b* are sandwiched and pressurized by the first die 121 brought into contact with the other flat face of the bonded portion 22*b* and the second die 122 brought into contact with the bonding portion 11*b* of the core wire exposed portion 11*a*. The ultrasonic bonding machine 120 includes an ultrasonic vibrator (not illustrated) and applies ultrasonic vibration from the ultrasonic vibrator to the second die 122.

Here, ultrasonic vibration along the axial direction of the core wire exposed portion 11*a* is applied to the second die 122. In the bonding step, the bonding portion 11*b* is compressed to a position lower than the height of the core wire 11 corresponding to the core wire diameter thereof measured from the flat face 22*a* of the core wire connection portion 22 by the pressure applied to the bonding portion 11*b* between the first die 121 and the second die 122. Therefore, in the bonding step, the height of the core wire exposed portion 11*a* from the flat face 22*a* of the core wire connection portion 22 gradually decreases from the end face of the sheath 12 of the electric wire terminal 10*a* to the bonding portion 11*b*. That is, in the bonding step, the second die 122 squashes the bonding portion 11*b* while reciprocating in the vibrating direction of the ultrasonic vibration to create a slope at the core wire exposed portion 11*a* from the end face of the sheath 12 to the bonding portion 11*b*. Therefore, in this bonding step, the second die 122 reciprocating in the axial direction of the core wire exposed portion 11*a* may collide with the slope. When the second die 122 collides with the slope, the element wires 13 on the surface of the slope may be cut.

In view of the above, a compressed recess 14 is provided in advance before proceeding to the bonding step between the bonding portion 11*b* of the core wire exposed portion 11*a* and the end face of the sheath 12 (FIG. 2). The compressed recess 14 is a recess disposed on the second die 122 side in the bonding step and is more compressed than the bonding portion 11*b* after ultrasonic bonding in the same compression direction as the compression direction for the bonding portion 11*b* at the time of ultrasonic bonding. As a result, between the bonding portion 11*b* of the core wire exposed portion 11*a* and the end face of the sheath 12, the terminal-equipped electric wire 1 includes the compressed recess 14 which is compressed toward the flat face 22*a* of the core wire connection portion 22 and is recessed to a position lower than the height of the bonding portion 11*b* from the flat face 22*a* of the core wire connection portion 22 (FIGS. 1 and 3).

In order to prevent the second die 122 reciprocating in the vibrating direction of the ultrasonic vibration from coming into contact with a portion further on the sheath 12 side than the bonding portion 11*b* of the core wire exposed portion 11*a*, the compressed recess 14 is formed between the bonding portion 11*b* of the core wire exposed portion 11*a* and the end face of the sheath 12 as a recess having a position and a shape that can avoid the reciprocating second die 122. If the configuration with only one compressed recess 14 cannot avoid the reciprocating second die 122, a plurality of compressed recesses may be provided. The compressed recess 14 illustrated here is a single groove-shaped recess having an arc-shaped bottom face and is continuously connected to an end of the bonding portion 11*b* on the sheath 12 side.

The method of manufacturing the terminal-equipped electric wire 1 includes a core wire processing step of forming the compressed recess 14 at the core wire exposed portion 11*a*. The manufacturing machinery 101 for the terminal-equipped electric wire 1 includes a core wire forming machine 130 for performing the core wire processing step (FIG. 4). For example, the core wire processing step may be performed on the electric wire alone before the electric wire placing step is performed or may be performed on the electric wire 10 in a state of being held by the terminal fitting 20 before the bonding step is performed after the electric wire holding step is completed. Here, the core wire processing step performed on the electric wire alone will be described.

The core wire forming machine 130 includes a first pressing die 131 and a second pressing die 132 that form the compressed recess 14 at the core wire exposed portion 11*a* while sandwiching and pressurizing the core wire exposed portion 11*a* (FIG. 2). In the core wire forming machine 130, the core wire exposed portion 11*a* is placed on the first pressing die 131, and while the first pressing die 131 and the second pressing die 132 are brought closer to each other, the compressed recess 14 is formed at the core wire exposed portion 11*a* by a protrusion 132*a* provided at the second pressing die 132. At least one protrusion 132*a* is provided corresponding to the number of compressed recesses 14.

For example, the first pressing die 131 includes a semi-arc-shaped wall face along the outer peripheral face of the core wire exposed portion 11*a*, and the core wire exposed portion 11*a* is placed on the wall face. The second pressing die 132 includes: a wall face to be brought into contact with the outer peripheral face of the core wire exposed portion 11*a*; and the protrusion 132*a* protruding from a part of the wall face. For example, the second pressing die 132 may include the wall face formed in a semi-arc shape and merely form the compressed recess 14 at the core wire exposed portion 11*a* by using the protrusion 132*a*. Alternatively, in the second pressing die 132, not only may the compressed recess 14 be formed in the core wire exposed portion 11*a* by the protrusion 132*a*, but also, for example, may the wall face of the second pressing die 132 be planarly formed so as to squash the bonding portion 11*b* to a predetermined position by the wall face. The second pressing die 132 illustrated here includes the latter planar wall face. The second pressing die 132 illustrated here is a die that can reciprocate to be brought closer to or away from the first pressing die 131. The second pressing die 132 is attached to a drive unit (not illustrated) that causes the reciprocation.

In the core wire processing step, the core wire exposed portion 11*a* is placed on the semi-arc-shaped wall face of the first pressing die 131, and the second pressing die 132 is brought closer to the core wire exposed portion 11*a*. In the core wire processing step, accordingly, the second pressing die 132 comes into contact with the core wire exposed portion 11*a* on the first pressing die 131 first from the protrusion 132*a*, and the core wire exposed portion 11*a* is squashed by the protrusion 132*a* while the core wire exposed portion 11*a* is sandwiched and pressurized between the protrusion 132*a* and the first pressing die 131 to form the compressed recess 14.

Therefore, in the electric wire placing step of the present embodiment, the core wire exposed portion 11*a* is placed with the compressed recess 14 facing upward with respect to the flat face 22*a* of the core wire connection portion 22 of the terminal fitting 20 placed on one die. Then, in the electric wire holding step, the sheath holder 23 is swaged and crimped to the sheath 12 of the electric wire terminal 10*a* with the compressed recess 14 remaining facing upward.

Subsequently, in the bonding step of the present embodiment, when the bonded portion 22*b* of the core wire connection portion 22 is placed on the first die 121, the compressed recess 14 of the core wire exposed portion 11*a* faces upward and is disposed on the second die 122 side. Accordingly, in this bonding step, the bonded portion 22*b* and the bonding portion 11*b* are ultrasonically bonded to each other by the ultrasonic vibration applied to the second die 122 while the bonded portion 22*b* of the core wire connection portion 22 and the bonding portion 11*b* of the core wire exposed portion 11*a* are sandwiched and pressurized by the first die 121 and the second die 122. At this time in this bonding step, the second die 122 reciprocating in the vibrating direction of the ultrasonic vibration does not collide with a portion between the bonding portion 11*b* of the core wire exposed portion 11*a* and the end face of the sheath 12. Thus, occurrence of element wire breakage of the element wire 13 of the core wire exposed portion 11*a* can be prevented. Therefore, in this bonding step, the pressing force on the bonded portion 22*b* and the bonding portion 11*b* by the first die 121 and the second die 122 can be increased as compared with that in the conventional case. As a result, it is possible to perform ultrasonic bonding in which the portion between the bonded portion 22*b* and the bonding portion 11*b* and between the element wires 13 of the bonding portion 11*b* are brought into closer contact with each other. Hence, in this bonding step, the time required for ultrasonic bonding can be made shorter than that in the conventional case. As described above, the terminal-equipped electric wire 1 of the present embodiment is created in a shorter time than the conventional terminal-equipped electric wire through this bonding step while the occurrence of element wire breakage is prevented.

The terminal-equipped electric wire according to the embodiment includes a compressed recess between the bonding portion of the core wire exposed portion and the end face of the sheath. The compressed recess is recessed to a position lower than the height of the bonding portion from the flat face of the core wire connection portion. Therefore, when one die used for ultrasonic bonding is reciprocating in the axial direction of the core wire exposed portion while applying ultrasonic vibration and pressure to the bonding portion, the bonding portion of the core wire exposed portion can be ultrasonically bonded to the flat face of the bonded portion of the core wire connection portion to produce the terminal-equipped electric wire without colliding with a portion between the bonding portion of the core wire exposed portion and the end face of the sheath. Therefore, the terminal-equipped electric wire according to the embodiment can suppress occurrence of element wire breakage at the core wire exposed portion.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A terminal-equipped electric wire comprising:

an electric wire including a core wire that includes an element wire bundle and a sheath that covers the core wire over a circumferential direction, the electric wire including a core wire exposed portion in which a part of the core wire is exposed over the circumferential direction; and a terminal fitting including a core wire connection portion that includes a flat face on which the core wire exposed portion is placed, a bonding portion of the core wire exposed portion being ultrasonically bonded to the flat face of a bonded portion of the core wire connection portion, wherein the core wire exposed portion includes a compressed recess between the bonding portion and an end face of the sheath, the compressed recess being compressed toward the flat face of the core wire connection portion and being recessed to a position lower than a height of the bonding portion from the flat face of the core wire connection portion.

2. The terminal-equipped electric wire according to claim 1, wherein the compressed recess is continuously connected to an end of the bonding portion on a sheath side.

3. The terminal-equipped electric wire according to claim 1, wherein the bonding portion is compressed to a position lower than a height of the core wire corresponding to a diameter of the core wire, the height being measured from the flat face of the core wire connection portion.

4. The terminal-equipped electric wire according to claim 2, wherein the bonding portion is compressed to a position lower than a height of the core wire corresponding to a diameter of the core wire, the height being measured from the flat face of the core wire connection portion.

* * * * *